Jan. 10, 1956  J. PICKERING  2,730,160
APPARATUS FOR FORMING JOINTS BETWEEN THERMOPLASTIC SHEETS
Filed Oct. 16, 1951  4 Sheets-Sheet 1

INVENTOR
Joseph Pickering
BY
Jerome W. Paxton

INVENTOR
Joseph Pickering
BY
Jerome W. Paxton

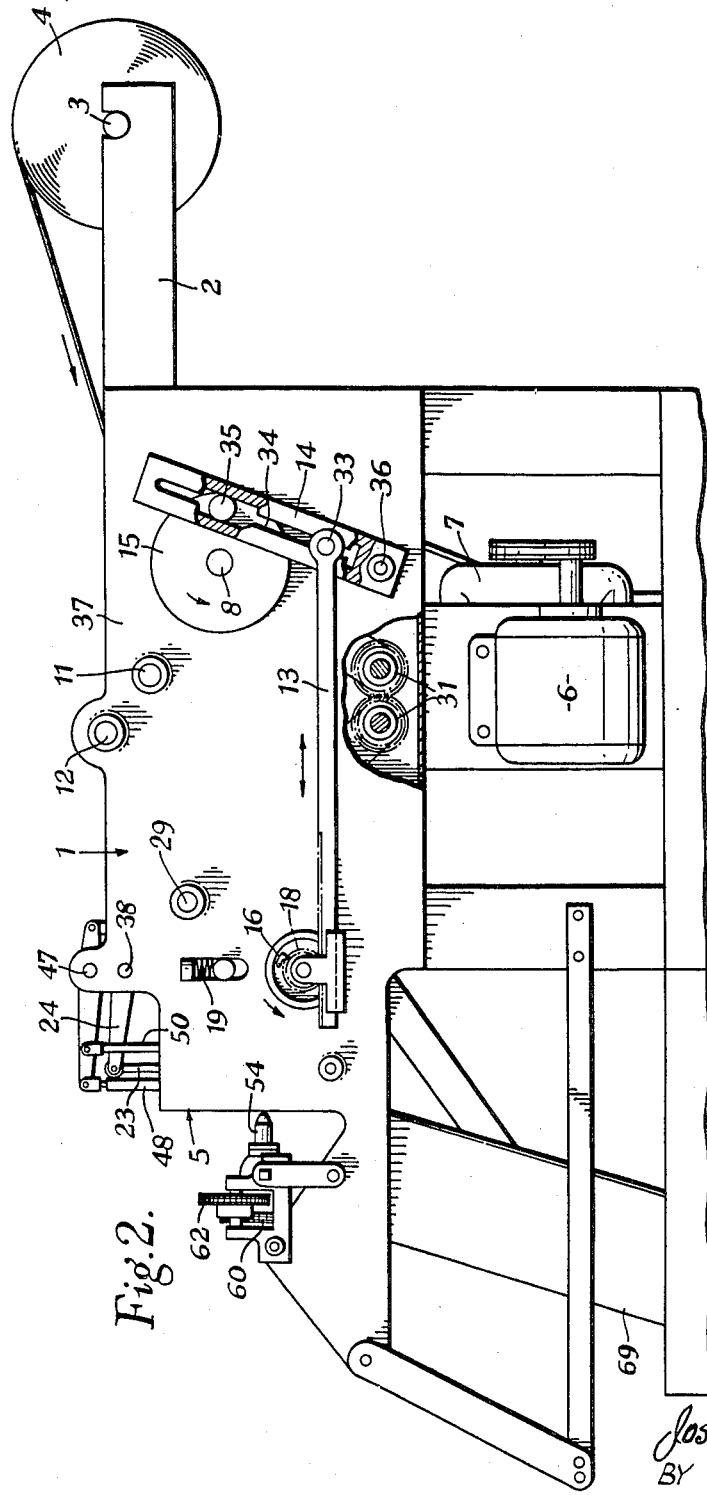

Jan. 10, 1956  J. PICKERING  2,730,160
APPARATUS FOR FORMING JOINTS BETWEEN THERMOPLASTIC SHEETS
Filed Oct. 16, 1951  4 Sheets-Sheet 4

INVENTOR
Joseph Pickering
BY
Jerome W. Paxton

United States Patent Office 2,730,160
Patented Jan. 10, 1956

2,730,160

APPARATUS FOR FORMING JOINTS BETWEEN THERMOPLASTIC SHEETS

Joseph Pickering, Leicester, England, assignor to The British Xylonite Company Limited, London, England, a British company Application October 16, 1951, Serial No. 251,478

Claims priority, application Great Britain October 16, 1950

8 Claims. (Cl. 154—42)

The present invention is concerned with the joining together of sheets or layers of thermoplastic material.

Various attempts have been made in the past to attach sheets of thermoplastic material together, involving the use of adhesives, the application of pressure, high frequency welding, and so on.

It is, however, an object of this invention to provide a method and a means whereby such attachment together or jointing of thermoplastic sheets can be effected rapidly, effectively, and without complicated apparatus.

Broadly stated, the present invention comprises a method of forming a joint between sheets of a thermoplastic substance, this method comprising clamping the sheets between a pair of jaws in layered form and so as to leave a portion of the substance exposed and ungripped, applying heat to this exposed portion to cause the substance to melt and coalesce, and allowing or causing the melt to cool so as to harden and form a joint between the sheets at the exposed portion thereof.

A preferred method according to the invention comprises feeding a pair of sheets of the thermoplastic substance to a clamping device, arresting the feed and clamping the layers face-to-face, at a position along their length, between a pair of jaws of the device, cutting through the two layers of thermoplastic substance adjacent the clamping position so as to leave narrow marginal strips of the material protruding from the clamping jaws, applying heat to these strips to cause them to melt and merge, and removing the heat to allow the melt to cool and thereby solidify to form a joint along the bite of the jaws.

By clamping the layers together in this way adjacent the line of severance, not only is the cutting facilitated, but the jaws also serve as a barrier to the melting action of the heat, which is therefore localized so as to form the joint only at the desired position.

The method may be carried out continuously in a cycle consisting of the forward feed, cutting, heating, cooling, forward feed and so on, thus producing a series of pairs of layers of thermoplastic sheeting joined transversely to the direction of the feed. From this it will be understood that, by using flattened tubular stock, for example bags or containers closed on three sides and open at the fourth can be manufactured seriatim.

Any thermoplastic material suitable for the objects in view and capable of melting under the action of moderate heat and forming a joint in this way can be employed, but it is found very suitable to employ polyethylene. Polyethylene becomes plastic at a relatively low temperature, so that only a comparatively small degree of heat is required to make a joint, whilst the latter is found to be very strong.

The depth, and thus the strength, of the joint may vary but will preferably be such that it does not form any substantial obtrusion in the finished article, for example a bag to which end the amount of projection from the clamping jaws of the thermoplastic sheeting prior to the heating may be made relatively small. Again, the joint will generally be continuous throughout the width of the layers of sheeting but could, for specific purposes, be interrupted or less in length than the total width.

The invention also extends to apparatus for carrying out the process herein set forth, such apparatus comprising a device having a pair of clamping jaws and a knife blade, for example, a guillotine, associated with these jaws and operable to sever the thermoplastic material adjacent, but a short distance from, the bite of the jaw.

To ensure protrusion of the marginal parts of the layers of thermoplastic material from the clamping jaws by the requisite amount, means (hereafter referred to as the "anvil") may be used which are arranged to act in co-operation with the cutting edge of the blade as a counter surface or edge when the cutting is carried out, but to be movable out of the way in response to travel of the blade so as to leave narrow, laminated, marginal strips of thermoplastic material exposed and freely-projecting from the jaws for melting when the knife blade has cut through the stock.

The apparatus further includes a travelling nozzle for projecting a hot gas or flame against the thermoplastic material protruding from the clamping jaws to effect the melting thereof.

In addition, the apparatus can advantageously be arranged for automatic performance of the various operations of clamping, cutting, heating, unclamping and advancing of the stock, for instance by a machine which will hereinafter be described.

A form of machine conforming with the invention is diagrammatically illustrated, by way of example, in the accompanying drawings, in which:

Figure 2 is an elevational view of the machine as seen from one side.

The purpose of the machine illustrated is to provide an automatic method of intermittently severing a continuous length of flattened tubular polyethylene material, and heat-sealing the applied and severed edges of the material still attached to the parent length, thereby to produce a series of bags.

Figure 5:
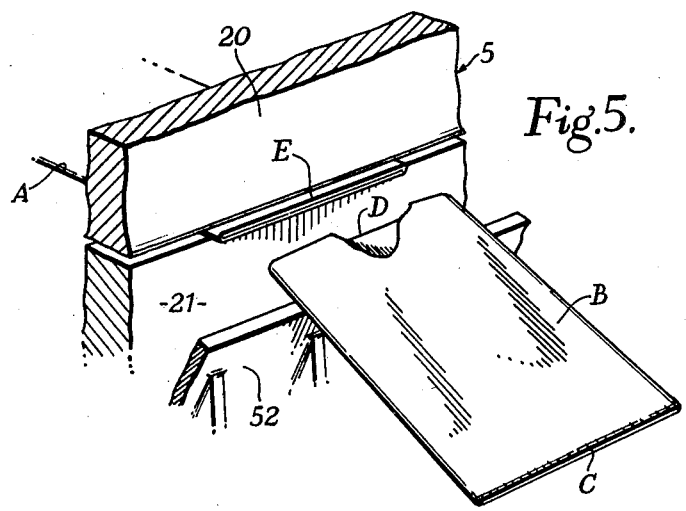
Figure 5 is a perspective detail to illustrate the procedure which occurs when a bag has been severed.

The tubing A is acted on at the working head 5 of the machine to effect the required severance and heat-sealing and is then advanced for the performance of the next severance, to produce a bag, such as is indicated at B in Figure 5, this being heat sealed and closed at its leading end C and open at its following end D.

The frame 1 of the machine has a pair of rearwardly extending bracket arms 2 forming a mounting for a rotatable shaft 3 carrying the wound reels 4 of flattened polyethylene tubing A. In the example illustrated there are two such reels, but it will be understood that any appropriate number could be used within the capacity of the machine, these moreover being of any approved width.

Mounted in the frame 1 is an electric motor 6 which, through a belt pulley transmission and a reduction gear at 7, drives a main operating shaft 8 from which a drive is distributed to the various moving parts of the machine.

Figure 4:
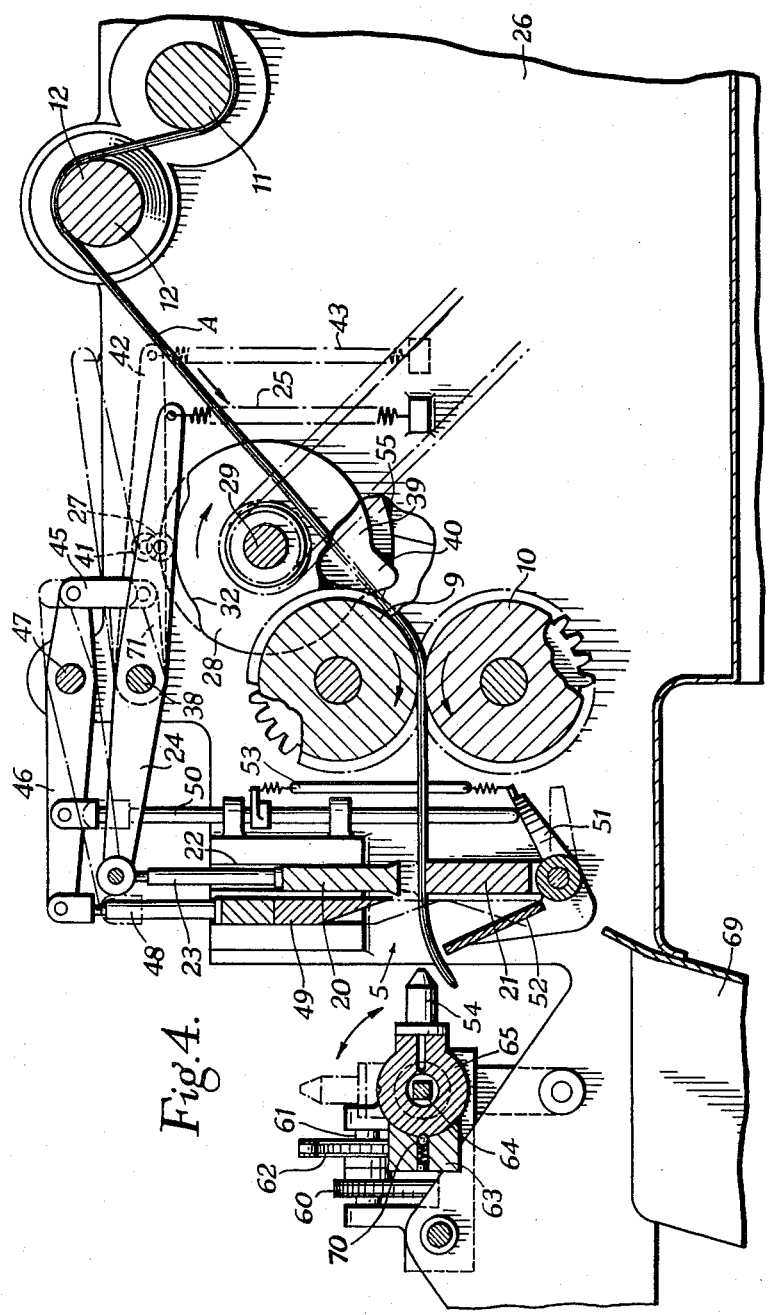
Figure 4 represents a cross section on the line IV—IV in Figure 1.

The tubing is advanced by frictional contact between a pair of co-operating feed rollers 9 and 10 (see Figure 4), after passing under and over straightening and tensioning fixed cross shafts 11 and 12. The rollers 9 and 10 are geared together at their ends and the lower feed roller 10 has its shaft carrying a sprocket 17 driven by a reciprocating rack bar 13. This bar is pivoted at 33 along a slot 34 in a block 14, so as to be adjustable along this block to vary the stroke of the feed rollers, and the slot 34 also receives a stud 35 eccentric on a disc 15 secured to operating shaft 8. The block 14 is fulcrumed at 36 on the side wall 37 of the machine frame. Hence the rack bar 13 will move at different speeds in its two directions of movement, i. e., its left to right travel in Figure 2 will be faster than in the opposite direction and the feed rollers will only rotate for, say, about one-quarter of the time that the shaft 8 takes to perform one revolution.

Figure 3:
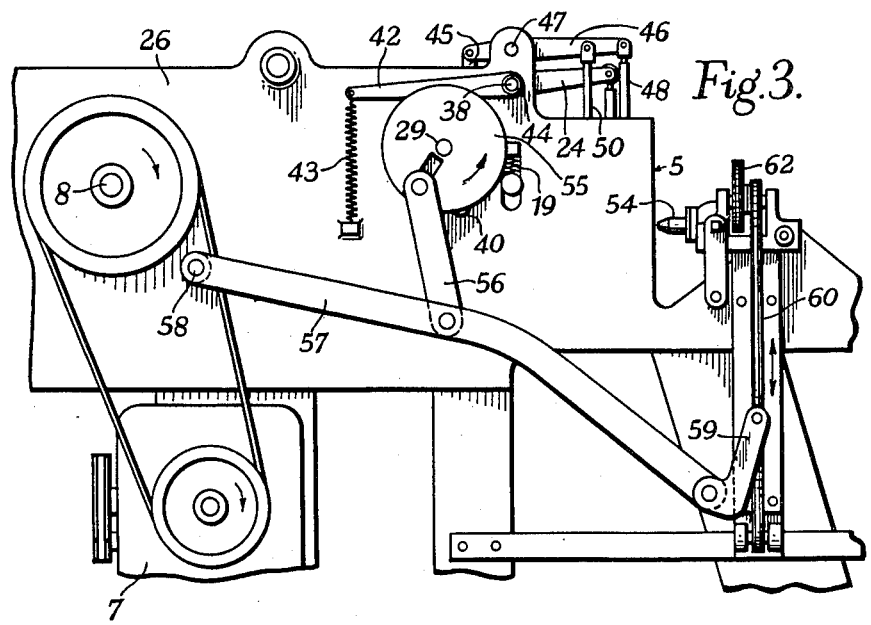
Figure 3 is a partial elevational view of the machine as seen from the opposite side.

A pawl 16, co-operating with a ratchet 18 on the shaft or roller 10, is provided for one-way driving by the rack bar 13 of the lower roller 10, wherefore the feed rollers will advance the tubing A stepwise. The shaft of the top feed roller is spring-pressed downwards, as indicated at 19 in Figures 2 and 3, to enable this roller to be raised for initial threading in of the polyethylene tubing. Locking cam means (not shown) can be employed for this purpose.

The pause in the forward feed of this tubing is utilized for the clamping, severing, and heat-sealing thereof.

Hence the working head 5 of the machine comprises a pair of co-operating transverse jaws 20 and 21, the lower (21) of which is fixed and the other adapted for raising and lowering in fixed end guideways 22 through side links 23 from rocking levers 24 connected together across the machine by their common fulcrum spindle 38. One of levers 24 is acted on by a tension spring 25 having a fixed anchorage inside the side wall 26 of the machine frame. This lever 24 has a follower roller 27 running on the edge of a cam 28 secured to a cam shaft 29 extending across the machine frame. This shaft 29 is driven from operating shaft 8 through a chain drive comprising a pair of endless chains 30 arranged as a V and having intermeshing sprockets 31.

The edge of cam 38 is recessed at 32 so as to allow the levers 24 to pivot and raise clamping jaw 20 during the forward feed of the tubing A. During the more lengthy return stroke of the rack bar 13, the jaw 20 bears down on fixed jaw 21 to clamp the tubing and act as a barrier to the flow of the molten polyethylene, as will be hereinafter explained.

The cam shaft 29 carries, outside the wall 26 of the frame, a further cam 39 having a nose 40 which acts on a follower 41 carried by a lever 42. The lever 42 is pivoted by a sleeve 44, mounted on the end of spindle 38, in the side wall 26 and is acted on at the opposite end by a tension spring 43 with a fixed anchorage. The pivot sleeve 44 is connected inside wall 26, with a short lever 71 in turn connected by a link 45 to a rocking lever 46. There are two such levers 46, one at each side of the machine, and they are movable in unison, being secured in common to a pivot spindle 47.

Each of the levers 46 carries at its forward end a rod 48 by means of which it is connected to a guillotine knife blade 49 which extends across the width of the machine and is adapted for reciprocation in the head 5 of the machine in a plane just in advance of the front of the clamp 20, 21. In addition, each of levers 46 is linked, towards its forward end, with a push rod 50 which bears at its lower end on a bracket 51 attached to a common, pivotally-mounted anvil plate 52.

The arrangement is such that the nose 40 of cam 39 acts, for each revolution of cam shaft 29, to cause a rapid forward and downward rocking of levers 46 in concert, thereby depressing knife 49 and effecting a simultaneous swinging of anvil plate 52 against the bottom clamping jaw 21. This plate 52 is of a thickness, preferably about 1/16 of an inch, equal to the distance of the plane of descent of knife, and the parts are dimensioned such that the plate 52 is applied against the jaw 21 just at and for the moment that the knife blade cuts through the polyethylene stock, thus forming an upward support for this stock. There is an instantaneous withdrawal of the knife 49, and a pivoting forward of the anvil 52 under the pull of tension spring links 53, leaving a flattened tube end projecting slightly beyond the bite of the closed clamp jaws 20 and 21, as seen at E in Figure 5.

This tube end is now sealed by traversing a nozzle 54 along and opposite the projecting end of the severed tubing from the same drive as the other moving parts. Hence, the cam shaft 29 has secured thereto at its outer end, beyond cam 39, a disc 55 having an eccentric link 56 pivoted thereto at a position which is adjustable to set the movement of nozzle 54 correctly. This link 56 is connected to a lever 57 pivoted at one end 58 on plate 26 and having at its forward end a bifurcated link 59 which is connected to a vertically-disposed endless chain 60. The upper sprocket over which this chain runs is fast on a spindle 61 which also carries an end sprocket of a second endless chain 62 which has its main runs disposed horizontally across the front of the machine opposite the joint between clamping jaws 20, 21. As will therefore be apparent, rotation of cam shaft 29 produces a back and forth travel of chain 62.

Figure 1:
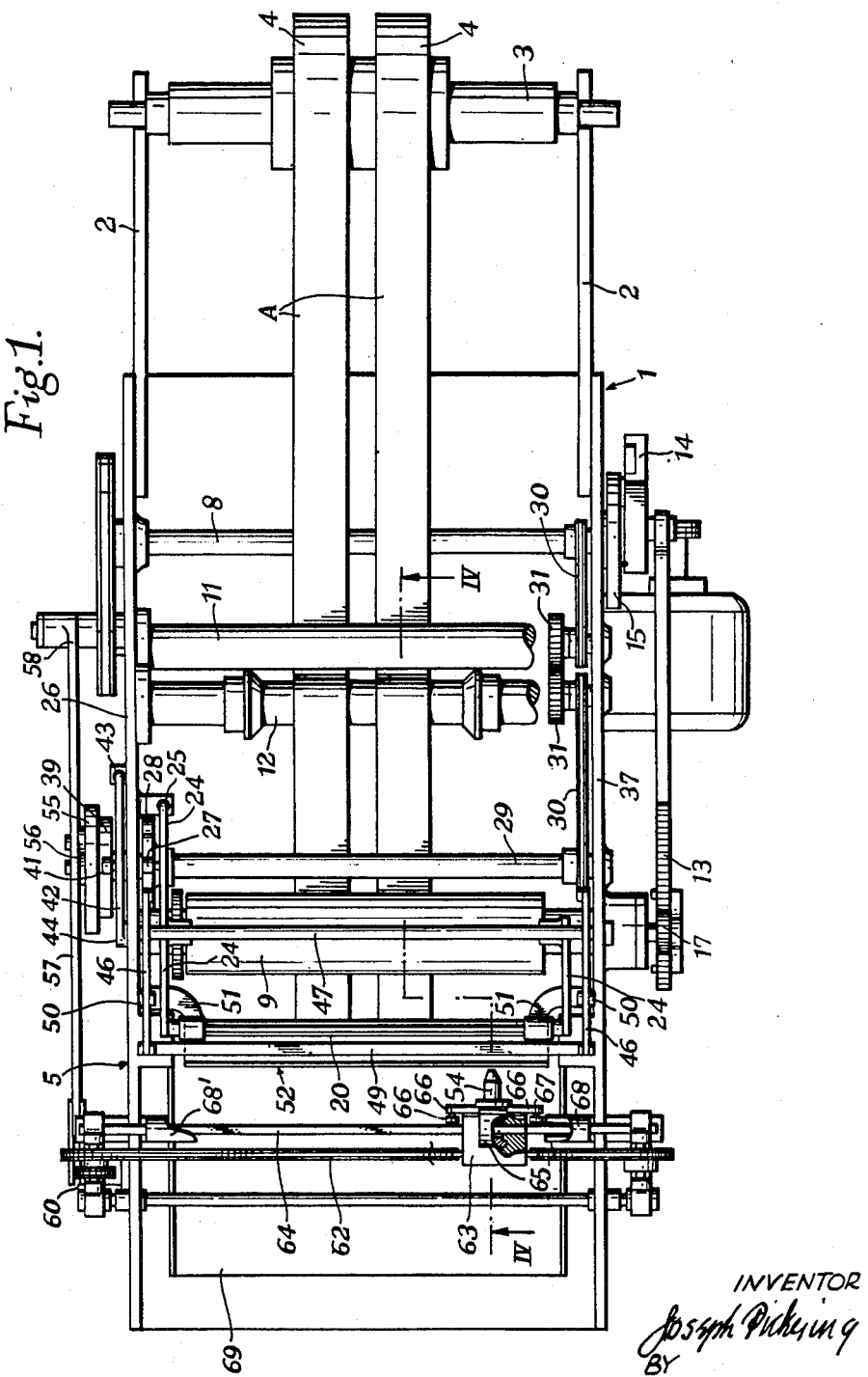
Figure 1 is a plan view of the machine.

Secured to the latter is a carriage 63 which is slidable on a cross bar 64 of square section and has, rotatably mounted therein, a cylindrical body 65 carrying the nozzle 54 and a lead (not shown) for the supply of coal gas to the latter. In addition the body 65 has a pair of side arms 66 each provided with a roller 67. These latter are provided for co-operation with cam edges on sleeves 68, $68^1$ disposed on the cross bar 64, in positions such that, when the carriage 63 is reaching the end of its travel to the left, i. e. the upper end in relation to Figure 1, the appropriate roller 67 runs over the cam surface of sleeve $68^1$, thus causing body 65 to pivot to point the nozzle 54 horizontally towards the clamp joint.

The carriage now runs from left to right across the machine with the nozzle so disposed, thus traversing a flame along the severed edges of the one or more flattened tubes projecting forwards of the clamp 20, 21. As a result, the material of the projecting marginal portions melts and coalesces, the clamping jaws 20, 21 limiting this action by forming a barrier to the further penetration of the melting, and when the nozzle has passed, the polyethylene material cools and a strong seam is formed. The jaws 20 and 21 can be cooled by a flow of liquid therethrough to assist this action and promote rapid cooling of the polyethylene.

When the carriage 63 reaches the right-hand end of its travel, the roller 67 at this end rides over the cam surface of sleeve 68, thereby swinging nozzle 54 into a vertical direction, in which condition it remains during the return of the carriage to the left-hand end of its run. During this return stroke the clamping jaws are opened, the polyethylene stock advanced, and the sealed bag B sheared off to fall into a receptacle 69 at the front of the machine. It will be noted from Figure 4 that a ball catch 70 is provided in carriage 63 for releasably retaining the body 65 in each of its alternative positions.

From the foregoing description it will be apparent that the machine provides for an entirely automatic intermittent advance of the polyethylene stock by a predetermined amount, the clamping of the stock, the severing of the bag-forming end portion, the heat sealing of the newly-severed end of the parent stock by a travelling flame, and so on in the original cycle. Furthermore these movements are timed with one another in a positive fashion by virtue of the disposition and operation of the parts described.

It will, of course, be understood that various changes can be made in the disposition of the parts of the machine specifically described and illustrated, provided they fall within the scope of the ensuing claims, and that additions can also be made thereto. Thus, for instance, the anvil 52 and the knife 49 can, in addition to the clamping jaws 20 and 21, both be cooled by a forced flow of liquid therethrough, being made hollow for this purpose.

Furthermore it is to be appreciated that the method of this invention can be carried into effect other than by the automatically-operating machine described. Hence, for example, a hand-operated apparatus could be employed, thus having a pair of clamping jaws, a pivoted cutting knife, and an anvil in the form of a thin bar or rigid strip which is mounted immediately beneath the bite of the clamping jaws and in such relation to the cutting path of the knife blade that its upper outer edge forms a cutting surface co-operating with that of the knife, whilst it can be engaged by the knife blade and thus carried away from the sheets by the knife during the cutting stroke but after the cutting operation proper.

The travel of the knife blade may also be used to provoke the opening and closing of the clamping jaws by direct action on, or release of, one of the jaws, thereby to cause or allow the two jaws to open and, when the knife blade moves in the opposite sense, to come together.

In conjunction with such an apparatus a burner or hot gas nozzle may be used which is movable by hand along a rail or slideway alongside the bite of the clamping jaws.

Bags produced in accordance with this invention may be used for a wide variety of purposes, for example for packaging vegetables, fruits, or other foodstuffs, sweetmeats, articles of clothing, sets of small objects, toys, liquids, and so on.

When such articles have been inserted in bags formed in this way, the open mouth of the bag may be closed by pressure or in any other appropriate fashion, for instance with the use of an additional strip of sealing material, for instance, paper.

Furthermore, by using a transparent thermoplastic material such as polyethylene, the contents of the bags can be inspected from the exterior. For the same reason printed or other advertising matter can also be introduced into the bag.

What I claim then is:

1. Apparatus for use in forming a joint between sheets of flattened thermoplastic material, comprising a pair of relatively-movable jaws for receiving and clamping therebetween the sheets, means advancing such sheets between the movable jaws, a knife blade mounted for reciprocation in a plane spaced in front of the bite between said clamping jaws and longitudinally of such jaws, means operatively connected with the knife blade to reciprocate such blade, an anvil movable into position between said clamping jaws and knife blade to provide a support for the thermoplastic material between the clamping jaws and knife blade and further means to move such anvil into said last named position.

2. Apparatus for use in forming a joint between sheets of flattened thermoplastic material, comprising a pair of relatively-movable jaws for receiving and clamping therebetween the sheets, means advancing the sheets between the movable jaws, a knife blade mounted for reciprocation in a plane spaced in front of the bite between said clamping jaws and longitudinally of such jaws, means operatively connected with the knife blade to reciprocate such blade, an anvil movable into position between said clamping jaws and knife blade to provide a support for the thermoplastic material between the clamping jaws and knife blade, means to move such anvil into the last named position, a nozzle for applying a hot gas or flame against the bite between the clamping jaws and means operatively connected to the nozzle for traversing said nozzle along this bite.

3. Apparatus for use in forming a joint between sheets of flattened thermoplastic material, comprising a pair of relatively-movable jaws for receiving and clamping therebetween the sheets, means for intermittently advancing the thermoplastic material to and between said jaws, means operatively connected with one of the jaws to move such jaw for opening and closing the bite between said jaws in timed relation with the advancing of the thermoplastic material, a knife blade mounted for reciprocation in a plane spaced in front of the bite between said clamping jaws and longitudinally of such jaws and means for reciprocating said knife blade in timed relation with the closure of the bite between said jaws.

4. Apparatus for use in forming a joint between sheets of flattened thermoplastic material, comprising a pair of relatively-movable jaws for receiving and clamping therebetween the sheets, a pair of cooperating rollers for feeding the thermoplastic material to the jaws, means for driving said rollers intermittently, means operatively connected with one of the jaws to move such jaw for opening and closing the bite between said jaws in timed relation with the advancing of the thermoplastic material, a knife blade mounted for reciprocation in a plane spaced in front of the bite between said clamping jaws, an anvil movable into position between said clamping jaws and knife blade to provide a support for the thermoplastic material between the clamping jaws and knife blade, means operatively associated with the anvil to move the anvil to said last named position, and means for reciprocating said knife blade in timed relation with the closure of the bite between said jaws.

5. Apparatus for use in forming a joint between sheets of flattened thermoplastic material, comprising a pair of relatively-movable jaws for receiving and clamping therebetween the sheets, a pair of cooperating rollers for feeding the thermoplastic material to the jaws, a continuously-driven shaft, a transmission gear including a ratchet and pawl mechanism for imparting a unidirectional motion to the feed rollers from said driven shaft, a camshaft operable from said driven shaft, a cam on said camshaft for effecting the raising and lowering of a movable jaw of said pair, a knife blade mounted for reciprocation in a plane spaced in front of the bite between said clamping jaws, an anvil movable into position between said clamping jaws and knife blade to provide a support for the thermoplastic material between the clamping jaws and knife blade and means for reciprocating said knife blade in timed relation with the closure of the bite between said jaws.

6. Apparatus for use in forming a joint between sheets of thermoplastic material, comprising a pair of relatively-movable jaws for receiving and clamping the sheets, a pair of cooperating rollers for feeding the thermoplastic material to the jaws, a continuously-driven shaft, a transmission gear including a ratchet and pawl mechanism for imparting a unidirectional motion to the feed rollers from said driven shaft, a camshaft operable from said driven shaft, a cam on said camshaft for effecting the raising and lowering of a movable jaw of said pair, a knife blade mounted for reciprocation in a plane spaced in front of the bite between said clamping jaws, an anvil movable into position between said clamping jaws and knife blade to provide a support for the thermoplastic material between the clamping jaws and knife blade, a second cam on said camshaft, and a link and lever system movable by said second cam for effecting the reciprocation of said knife blade.

7. Apparatus for use in forming a joint between sheets of flattened thermoplastic material, comprising a pair of relatively-movable jaws for receiving and clamping therebetween the sheets, means for intermittently advancing the material between the jaws, a knife blade mounted for reciprocation in a plane spaced in front of the bite between said clamping jaws and longitudinally of such jaws, a nozzle for applying a hot gas or flame against the bite between the clamping jaws, means for reciprocating said nozzle along the bite between said clamping jaws, and means operatively associated with the nozzle for orientating said nozzle towards this bite in one direction of travel of the nozzle and away from this bite in the opposite direction of travel.

8. Apparatus for use in forming a joint between sheets of thermoplastic material, comprising a pair of relatively-movable jaws for receiving and clamping the sheets, a pair of cooperating rollers for feeding the thermoplastic material to the jaws, a continuously-driven shaft, a transmission gear including a ratchet and pawl mechanism for imparting a unidirectional motion to the feed rollers from said driven shaft, a camshaft operable from said driven shaft, a cam on said camshaft for effecting the raising and lowering of a movable jaw of said pair, a knife blade mounted for reciprocation in a plane spaced in front of the bite between said clamping jaws, an anvil movable into position between said clamping jaws and knife blade to provide a support for the thermoplastic material between the clamping jaws and knife blade, a second cam on said camshaft, a link and lever system movable by said second cam for effecting the reciprocation of said knife blade, a nozzle for applying a hot gas or flame against the bite between the clamping jaws, means for reciprocating said nozzle along the bite between said clamping jaws and means for orientating said nozzle towards this bite in one direction of travel of the nozzle and away from this bite in the opposite direction of travel.

References Cited in the file of this patent

UNITED STATES PATENTS

| | | |
|---|---|---|
| 2,284,724 | Church | June 2, 1942 |
| 2,387,812 | Sonneborn et al. | Oct. 30, 1945 |
| 2,474,917 | Schenk | July 5, 1949 |
| 2,488,212 | Lloyd | Nov. 15, 1949 |
| 2,510,383 | Dalgleish | June 6, 1950 |
| 2,529,847 | McClellan | Nov. 14, 1950 |
| 2,627,213 | Nye | Feb. 3, 1953 |
| 2,638,147 | Nebel | May 12, 1953 |